May 7, 1935.  N. DEISCH  2,000,378

ADJUSTING EFFECTIVE INCREMENTAL PERMEABILITY OF MAGNETIC CIRCUITS

Filed July 15, 1929

Inventor
Noel Deisch
By R. A. Rivers,
Attorney

Patented May 7, 1935

2,000,378

UNITED STATES PATENT OFFICE 2,000,378

ADJUSTING EFFECTIVE INCREMENTAL PERMEABILITY OF MAGNETIC CIRCUITS

Noel Deisch, Washington, D. C., assignor of one-half to Thos. E. Stone, Jr., New York, N. Y.

Application July 15, 1929, Serial No. 378,515

4 Claims. (Cl. 171—242)

The present invention relates to electrical apparatus having a magnetic circuit with non-linear saturation characteristic and subject to both continuous and alternating magnetomotive forces, and more especially to electrical coils and coil systems having ferromagnetic core and operating on current including continuous and alternating components.

The general object of the invention, broadly stated, is to provide a method of correcting the mean effective constant of incremental permeability of the magnetic circuit of alternating current apparatus, where the magnetic circuit has different incremental permeability at different levels of continuous magnetic saturation and is subject to an adventitious continuous magnetomotive force and an operative alternating magnetomotive force. More specific objects of the invention will become apparent as the description proceeds.

Referring to the drawing.

Under certain conditions of operation of electrical apparatus, the iron core, which forms an important part of or constitutes the magnetic circuit of the apparatus in question is normally subject to a comparatively large continuous magnetomotive force due to a direct current, on which is superposed a much smaller alternating magnetomotive force due to an alternating current. The direct component of the current in the examples cited is merely incidental and adventitious in so far as the operation of the apparatus is concerned, and in most cases is decidedly prejudicial to the best performance of the apparatus, for reasons which will be presently developed. The general character of this type of current is shown graphically in Fig. 4, where the amplitude of the continuous component of the current flowing in the primary of the coil is arbitrarily shown as being of the value indicated at 12, and the amplitude of the alternating component is shown as being of the value indicated at 13; the term "alternating current" as herein used thus includes the case of a non-periodic variation from the mean continuous current level, such as is caused by modulating a continuous current to present an electrical simulacrum of sound waves.

Figure 1:
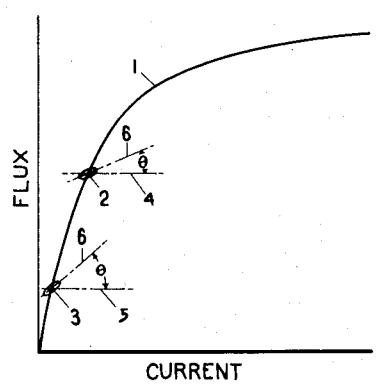
Fig. 1 is a diagram showing the form of the saturation characteristic of a sample of iron, the excited magnetic flux being shown as ordinates and the magnetizing force as abscissae. The different inclination at different points on the saturation curve of hysteresis loops due to alternating changes in the magnetizing force through a limited magnitude are also shown.

The action of the continuous component of the current is to saturate the core of the coil up to a certain level: the alternating current component then induces changes in the saturation of the core through a certain amplitude on either side of this level. Owing to the fact that the alternating current permeability or incremental permeability of the iron core becomes reduced by the initial magnetization caused by the continuous component of the magnetizing current, the efficiency of the coil as a current transformer is lowered. By "incremental permeability" is meant the ratio of the increment of change of saturation to the increment of change of magnetomotive force at a given position on the saturation curve. The loss of efficiency referred to occurs in all cases where the magnetic circuit of electrical apparatus has a magnetization characteristic which is non-linear, that is, where the characteristic corresponding to I of Fig. 1 is not a straight line. This is especially the case, for example, with magnetic materials known as "ferromagnetic" materials, particularly iron, nickel, cobalt and their alloys.

Figure 2:
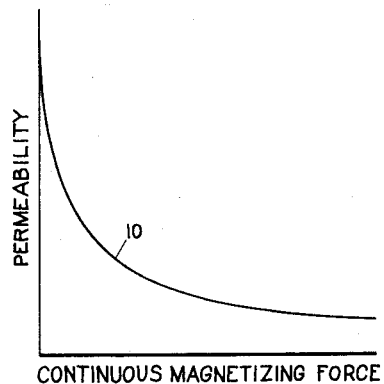
Fig. 2 is a diagram illustrating the manner in which the alternating current permeability of the iron core of a coil in which both direct and alternating current is flowing changes as the continuous magnetizing force due to the direct current component is altered in value.

The rapidity with which the alternating current permeability may decrease in the initial stages of continuous magnetization is shown in Fig. 2, where the curve 10 represents the permeability of an experimental iron core at an alternating current frequency of about 1000 cycles, the alternating current permeability being plotted as ordinates and the magnetizing force due to the continuous component of the current as abscissae.

The reason for the loss of efficiency above referred to may be explained as follows: Assume the iron core of the coil or transformer to be carried through a magnetic cycle, as occurs when such a coil is inserted in an alternating current circuit. Under these conditions it is known that the curve representing saturation plotted against magnetizing force does not coincide with the saturation curve 1, Fig. 1, but describes a loop extending to some distance on either side of this curve, as illustrated in the hysteresis loops 2 and 3 of Fig. 1. The amplitude of the loop described measured as an ordinate will of course depend on the amplitude of the alternating current concerned. The alternating current permeability of the core material at any level is ordinarily measured as an average value by the slope of the axis 6 of the hysteresis loop described about the point marking the level in question: this measure corresponds to the mean effective incremental permeability of the core material at this point. The slope of the axis of the hysteresis loop decreases as the hysteresis loop takes up positions successively higher on the permeability curve; the efficiency of the coil, therefore, also decreases. It is thus in general advantageous to efficiency that the loop described by the alternating current component flowing in the primary of the coil be held at a low position on the saturation curve.

The fact may be illustrated in a practical way by considering the case of a choke coil working in one of the stages of an audio-frequency amplifier. Suppose that the continuous current due to the normal plate current (represented by 12 in Fig. 4) saturates the core up to the level 5 of Fig. 1. The alternating component of the primary current will then cause the iron to execute a hysteresis loop 3 about the point 5, having a slope θ of a certain value. Assume now that the value of the continuous current is increased to a degree such that the core is magnetized to the level 4 of Fig. 1. The hysteresis loop 2 is now described, whose slope θ₁ is smaller than that of the loop 3. At still higher levels on the curve the inclination of the loop becomes even smaller, and the loss in efficiency is still more pronounced.

The effect described has an important adverse bearing on the design of electromagnetic apparatus. It excludes the use of modern magnetic alloys having very high permeability for magnetic fields of low strength in many cases where the use of these alloys would for other reasons be especially desirable, this due to the fact that the lowering of the incremental permeability resulting from the continuous component of the current is especially pronounced in these alloys. The efficiency of such electromagnetic apparatus is much reduced, for if the voltage and consequently current is sufficiently increased, the level of normal flux density of the core of the apparatus is raised so high on the saturation curve, and consequently the slope of the hysteresis loop is decreased to such an extent, that the output of the apparatus is actually less than it was when operating at less voltage and current.

In the present invention the above difficulties are overcome through the expedient of applying a magnetomotive force to the core of the coil opposite in polarity to the polarity of the continuous magnetomotive force or magnetic bias normally active in the coil (in the above illustration, the magnetic force produced by the continuous component of the current active in the windings of the coil) to the end that the two oppositely acting magnetomotive forces partially or wholly neutralize each other, whereby the continuous saturation of the core is brought to a desired low value or entirely eliminated. This has the effect of bringing the alternating current hysteresis loop to any desired point on the saturation curve, that is, to a level where the mean effective incremental permeability is of a desired value, whereby the alternating current efficiency of the coil may be greatly increased.

Figure 3:
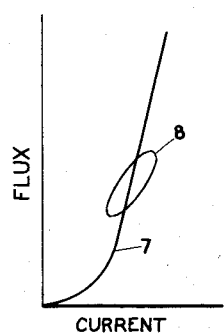
Fig. 3 is a diagram showing greatly enlarged the toe portion of the saturation characteristic of a sample of core iron.

It may not, with all core materials and in all applications, be desirable entirely to eliminate the continuous magnetic bias of the core, for reasons that will be clear from an inspection of Fig. 3, which shows on an enlarged scale the toe portion of the saturation curve of a sample of iron such as is often used in the cores of alternating current transformers. It is seen that due to the low initial saturation which exists up to the point of flexion 7 of the curve, and the consequent low permeability in this region thus implied, it will usually be desirable to hold the hysteresis loop 8 at a level somewhat above the point 7 in apparatus employing core material having a saturation characteristic of this type. In other words, it may in certain cases be beneficial to efficiency to hold the normal or working saturation level of the coil at some positive value, rather than to balance out the normal saturation entirely. This is done by providing a certain predetermined magnetomotive bias to the core by means presently to be described.

Figure 4:
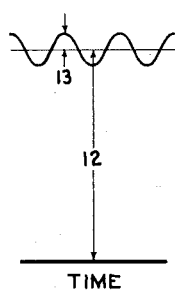
Fig. 4 is a diagram showing the trace of an alternating current superposed on a direct current, such as under certain conditions of operation is used to excite cored coils.
Figure 5:
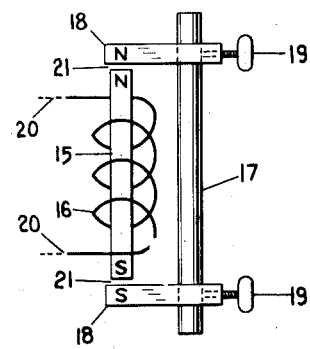
Fig. 5 illustrates an application of the method herein disclosed to a choke coil, a contra-acting magnetomotive force being produced in the core of the coil by means of an associated permanent magnet.
Figure 6:
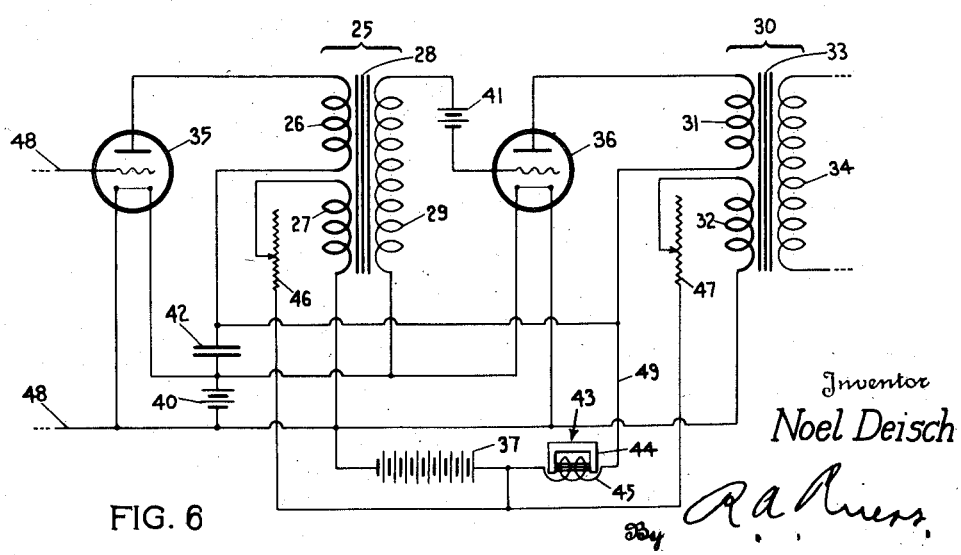
Fig. 6 shows an application of a choke coil similar to that shown in Fig. 5 to an audio-frequency amplifying system.

An illustration of the practice of the method herein described is shown in Fig. 5, which represents a choke coil designed to operate at greater efficiency than the usual type of choke coil on current of the type indicated in Fig. 4. The coil comprises a core 15 and a winding 16, in which the continuous component of the activating current which is brought to the coil through the leads 20 produces a magnetizing force having the polarity indicated by N and S at the opposite ends of the core 15 of the coil. In this illustration of the practice of the method the normal magnetic saturation of the core 15 is shown as modified by means of a magnetomotive force generated in a permanent magnet 17, provided with end-pieces 18 which may be adaptable to be slid along the magnet 17 to permit variation of the width of the air-gap 21, and so to allow adjustment of the magnetic potential active in the core 15 of the coil. Clamping screws 19 are provided to hold the end-pieces 18 permanently in position. The polarity of the magnet 17 indicated by the letters N and S on the end-pieces 18, is such as to subject the core 15 to a magnetomotive force of a polarity opposite to the polarity of the field produced by the continuous component of the current flowing in the winding 16. The value of this magnetomotive force is varied by changing the air-gap 21 until the choking action of the coil is most pronounced, i. e., until the alternating current performance of the coil is at its best. An illustration of the application of such a coil in an audio-frequency amplifying system is shown in Fig. 6. This system includes a transformer 25 having primary windings 26 and 27, a core 28, and a secondary winding 29; and a second transformer 30 having primary windings 31 and 32, a core 33, and a secondary winding 34. Vacuum tubes 35 and 36 function as detector and amplifier, respectively. A battery 37 produces an E. M. F. between the filament and plate of the two tubes, as also between the terminals of the windings 27 and 32 of the transformers 25 and 30. Variable resistances 46 and 47 are provided to permit adjustment of the current flow in coils 27 and 32. There is also provided a filament heating battery 40, a grid biasing battery 41, a by-pass condenser 42, and a choke 43. The choke 43 is similar to that shown in Fig. 5, except that the biasing permanent magnet 44 is not fitted with movable pole-pieces to permit of adjusting the air-gap, no air-gap being in this case provided. The current entering the winding 45 of coil 43 by lead 49 possesses a continuous component and an alternating component, the resulting magnetic bias of which continuous component is canceled by the action of the permanent magnet 44. The combined direct and alternating exciting current which enters at the input leads 48 of the amplifying system passes through the primary 26 of transformer 25, whereas winding 27 is supplied with continuous exciting current by the battery 37; the continuous current excitation of the coil is thus divided into two components, which flow respectively in coils 26 and 27 to produce magnetomotive forces of opposite polarity. By means of the variable resistances 46 and 47 the current flow in coils 27 and 32 is adjusted to provide the amount of compensation required to give a desired amount of magnetic bias or continuous magnetic saturation to cores 24 and 33, to secure maximum alternating current efficiency in the amplifying system.

While I have shown an illustrative application of my method, I do not desire to be limited to the application shown, but wish to include within the compass of the method all applications which come within the scope of the invention as defined in the appended claims.

I claim:

1. In electromagnetic apparatus to function with composite current including constant and alternating components; a ferromagnetic core, an exciting winding, and means including a permanent magnet to superpose a permanent magnetomotive bias on said core of opposite polarity to the magnetomotive force generated by the constant component of said composite current, whereby the undesired flux caused by said constant component is at least partially canceled.

2. A choke coil adapted to operate with composite currents including a magnetizable core, an exciting winding surrounding said core, and a permanent magnet including a central member and end-pieces adjustably attached to said central member, said end-pieces overlapping the ends of said core whereby the saturation of said core by the unidirectional component of said composite current is controlled.

3. A choke coil including a magnetizable core, an exciting winding adapted to carry a composite current surrounding said core, a permanent magnet having its poles overlapping the end portions of said core to superpose a permanent magnetomotive bias on said core of opposite polarity to the magnetomotive force set up by the unidirectional component of said composite current, and means to vary the effective bias of said permanent magnet.

4. An electro-magnetic apparatus including a magnetizable element, a permanently magnetized element, said elements having ends which lie adjacent one another, an exciting winding adapted to carry a composite current including constant and alternating components surrounding said magnetizable element, the flux tending to be set up in said magnetizable element by said magnetized element being of opposite polarity and of substantially equal magnetomotive force to that set up by the constant component of said composite current, whereby the effective output of said apparatus as regards the alternating component of said current is increased.

NOEL DEISCH.